United States Patent [19]
Zocca et al.

[11] Patent Number: 6,102,292
[45] Date of Patent: Aug. 15, 2000

[54] METHOD OF COMPENSATING THE EDGE POSITIONS OF A SIGNAL GENERATED BY SCANNING A BAR CODE

[75] Inventors: Rinaldo Zocca, Bologna; Marco Bottazzi, Ferrara; Francesco Caselli; Claudio Saporetti, both of Bologna, all of Italy

[73] Assignee: Datalogic S.p.A., Italy

[21] Appl. No.: 09/205,396

[22] Filed: Dec. 4, 1998

[51] Int. Cl.[7] .................................................. G06K 7/10
[52] U.S. Cl. ............................. 235/462.27; 235/462.25
[58] Field of Search .......................... 235/462.27, 462.25

[56] References Cited

U.S. PATENT DOCUMENTS

| | | | |
|---|---|---|---|
| 5,008,950 | 4/1991 | Katayama et al. | 235/454 |
| 5,278,400 | 1/1994 | Appel . | |
| 5,302,813 | 4/1994 | Goreu . | |
| 5,446,272 | 8/1995 | Barkan . | |
| 5,545,888 | 8/1996 | Barkan et al. | 235/462.27 |

FOREIGN PATENT DOCUMENTS 0462772   12/1991   European Pat. Off. .

OTHER PUBLICATIONS

EPO Search Report May 29, 1998.
"Using Multiple Thresholding Method To Read Barcodes" IBM Technical Disclosure Bulletin, vol. 36, No. 6B, Jun. 1, 1993, pp. 539–540 XP 000377476.

*Primary Examiner*—Harold I. Pitts
*Attorney, Agent, or Firm*—Hall, Priddy, Myers & Vande Sande

[57] ABSTRACT

A method of compensating the edge positions of a signal generated by scanning elements of a bar code, the method including the steps of lighting the code and determining the light diffused by the code to generate in response a signal having a substantially alternating waveform defined by a sequence of high-amplitude portions separated by and joined to low-amplitude portions by steeply sloping edges of the waveform. A number of local minimum and maximum points of the waveform are determined to determine coordinates defining approximate edge positions. The coordinates are then corrected to generate modified coordinates, each relative to a corrected position of the edge compensating for any shift in the edge induced by blurring of the signal.

12 Claims, 4 Drawing Sheets

METHOD OF COMPENSATING THE EDGE POSITIONS OF A SIGNAL GENERATED BY SCANNING A BAR CODE

BACKGROUND OF THE INVENTION

The present invention relates to a method of compensating the edge positions of a signal generated by scanning a bar code.

As is known, bar codes (FIG. 1b) are optical codes containing coded information defined by a number of dark-coloured (normally black) rectangular elements (bars) separated by light-coloured (normally white) elements (spaces).

Devices for reading such codes normally comprise a lighting device (e.g. a laser beam source, a linear array of LEDs, etc.) for directing light on to the bar code and a sensor (e.g. a photodiode, a linear array of photodetectors or a television camera) for receiving part of the light diffused by the support on which the bar code is impressed. In response to the light impinging on it, the sensor produces an alternating electric output signal, the waveform of which is modulated by the sequence of light/dark bar code elements. As is known, light is absorbed by the bars and reflected by the spaces, so that the signal assumes a high value (peak) corresponding to a space, on account of the high radiation impinging on the sensor, and a low value (valley) corresponding to a bar, on account of the low radiation impinging on the sensor. The signal generated by scanning the bar code therefore has a typical alternating pattern comprising a sequence of peaks and valleys, each peak corresponding to a space, and each valley to a bar.

Figure 4:
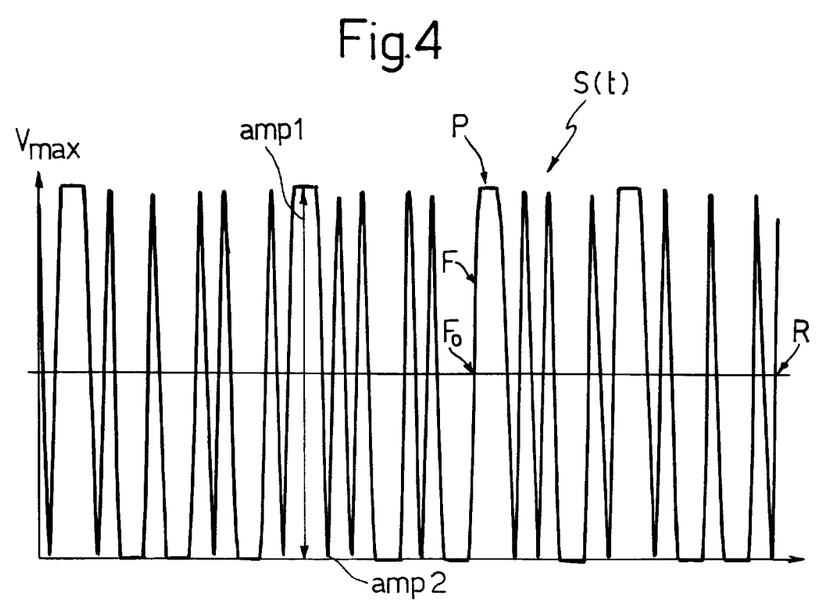
FIG. 4 shows a time graph of an ideal signal.

The region between a peak and two adjacent valleys represents the width of a space and the region between a valley and two adjacent peaks the width of a bar. FIG. 4, for example, shows the waveform of a bar code scanned in ideal conditions (perfectly focused signal with no noise).

Currently used readers examine the above waveform to determine the positions of edges F of the waveform, i.e. the steeply sloping waveform portions between the peaks and valleys and vice versa; each of which edges corresponds to the edge between two different-coloured bar code elements (space and bar and vice versa). The position of the edges is used to calculate the dimensions of the bar code elements and so permit subsequent decoding.

As is known, the alternating signal is subject to severe deformation due to a number of factors, including:

Code blurring B. This is defined mathematically as the ratio between the standard deviation std of the function describing the spatial energy dispersion of the laser beam (spot) lighting the optical code and the dimension W of the narrowest code element, i.e. B=std/W. Blurring therefore increases with energy dispersion of the laser beam about the mean value, i.e. enlargement of the laser beam spot, and with the reduction in the dimensions of the bar code and seriously affects the waveform of the alternating signal by lowering the peaks representing the narrower spaces and raising the valleys representing the narrower bars of the code. Above a given blur value, even sequences of narrow elements between two wide elements are absorbed by the wide elements to produce only one edge and odd sequences of narrow elements between two wide elements merge to form one element.

Electrooptical acquisition system. Electrooptical acquisition systems are known to act as "low-pass" filters, which tend to eliminate the higher space frequencies of the scanned bar code signal. As long as the space frequencies of the code correspond to the pass-band operating region of the electrooptical device, deformation of the signal is negligible and the resulting measurements accurate. Conversely, when the reading device operates outside the pass band (because of a reduction in the print size of the code or because the code is outside the focus position of the electrooptical acquisition device), distortion of the analog signal is no longer negligible.

The above factors combine to seriously deform the waveform. One consequence of deformation is a shift in the edges, which assume positions, within the waveform, other than those which they would have in the absence of deformation.

Figure 5:
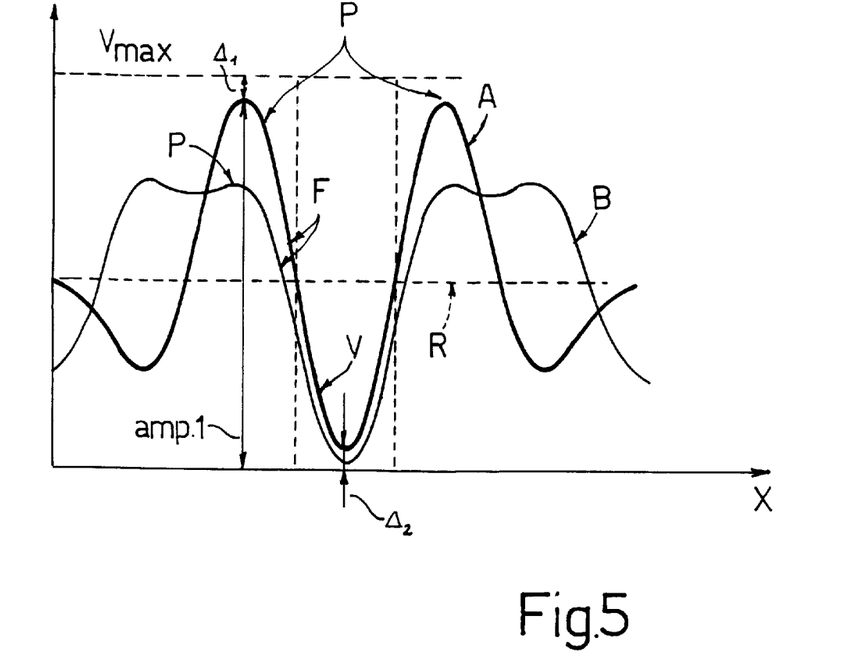
FIG. 5 shows a time graph of a blurred signal.

More specifically, considering pairs of adjacent code elements (bar-space or space-bar), the extent to which blurring affects the edge positions (FIG. 5) varies according to the dimensions of the adjacent code elements, in the sense that:

if the two adjacent elements (bar and space) are the same size (i.e. the same width), the corresponding peak and valley are shifted, with respect to the mean value of the signal, by substantially constant amounts (i.e. the amplitude of the peak is reduced by an amount substantially equal to the reduction in depth of the valley) so that the position of the edge is not seriously affected (curve A in FIG. 5); and if the two adjacent elements (bar and space) are of different sizes (different widths), the corresponding peak and valley are shifted differently with respect to the mean value of the signal, in the sense that the amplitude of the peak or valley corresponding to the narrower element is reduced to a greater extent than the peak or valley corresponding to the wider element, so that the position of the edge is seriously affected (curve B in FIG. 5).

In other words, blurring has the effect of "attracting" the edges towards the wider adjacent code elements.

The edge shift caused by the above factors (blurring and noise) therefore alters the width relationship between the code elements (bars and spaces), with obvious consequences as regards decoding of the code.

SUMMARY OF THE INVENTION

It is an object of the present invention to provide a method of compensating the edge positions of a signal generated by scanning a bar code, which provides for eliminating the aforementioned drawbacks by recovering the shift in the edges caused by blur-induced deformation of the waveform.

According to the present invention, there is provided a method of compensating the edge positions of a signal generated by scanning a bar code, wherein said signal has a substantially alternating waveform defined by a sequence of high-amplitude peaks separated by low-amplitude valleys; each peak corresponding to a space of the code and each valley corresponding to a bar of the code; the peaks being joined to the valleys by steeply sloping waveform edges; characterized by comprising the steps of: calculating a number of parameters, each representing a determined position of a respective edge along said waveform; determining a global threshold calculated over substantially the whole of said signal; calculating a local threshold in a predetermined region of said signal; calculating a local correction function by means of said global threshold and said local threshold; and applying said local correction function to a said calculated parameter to generate an output corrected parameter relative to a compensated position of said edge, said compensated position recovering possible shifts in the edge induced by blurring of said signal.

More specifically, the local threshold is calculated on the basis of signal values determined at an adjacent peak-valley pair defining an edge for compensation, whereas the global threshold is defined by the mean value of said signal.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1A:
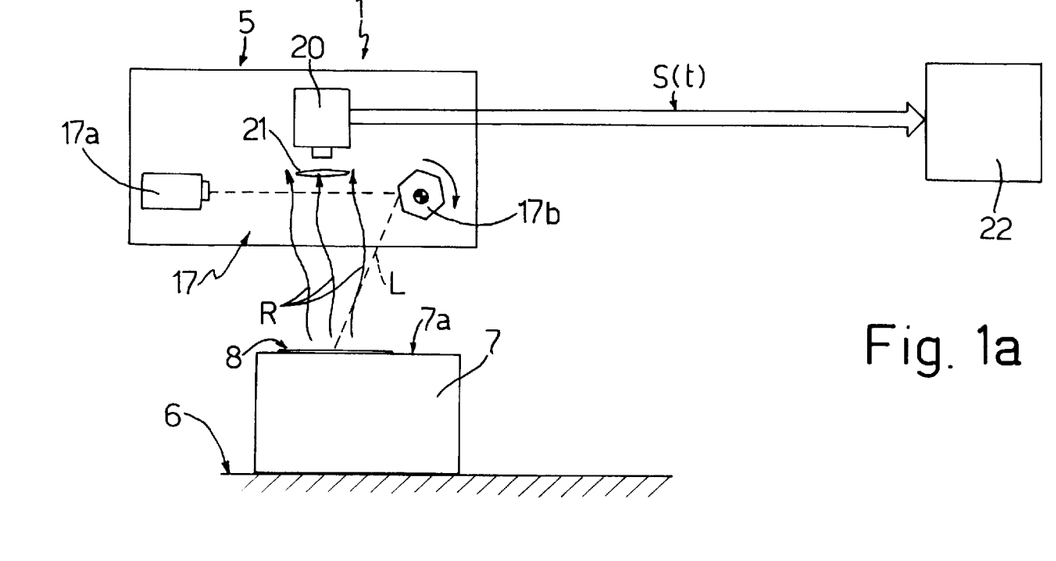
FIG. 1a shows schematically an optical code reading device, in particular for bar codes, implementing the method according to the present invention.
Figure 1B:
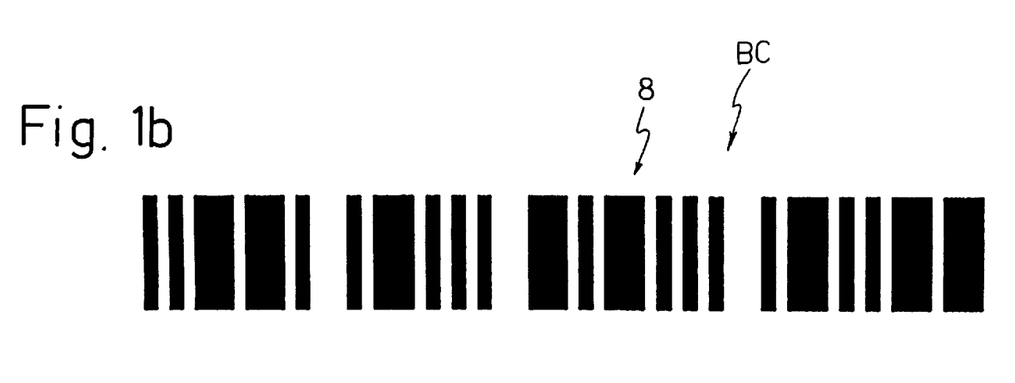
FIG. 1b shows a bar code.

Number 1 in FIG. 1a indicates as a whole a reading device comprising a read head 5 facing a supporting surface 6 for scanning objects 7 on surface 6. On the face 7a facing read head 5, each object 7 has an optical code 8, in particular a known bar code BC (FIG. 1b) defined by a number of dark-coloured (normally black) rectangular portions (bars) separated by light-coloured (normally white) portions (spaces). The rectangular portions may also be of different widths.

Read head 5 comprises a known lighting device 17 (e.g. comprising a laser source 17a and a rotary prismatic mirror 17b for reflecting the beam produced by source 17a) which directs a laser beam L on to optical code 8 to scan code 8. Read head 5 also comprises a sensor 20 (e.g. a photodiode) associated with an optical acquisition and focusing system 21 (shown schematically) which provides for determining the light R diffused by optical code 8, for generating an analog output signal S(t), the intensity of which is proportional to the brightness of the currently scanned portion of optical code 8. The analog signal S(t) is supplied to an electronic unit 22, which processes signal S(t) according to the present invention and provides for decoding the code.

Figure 2:
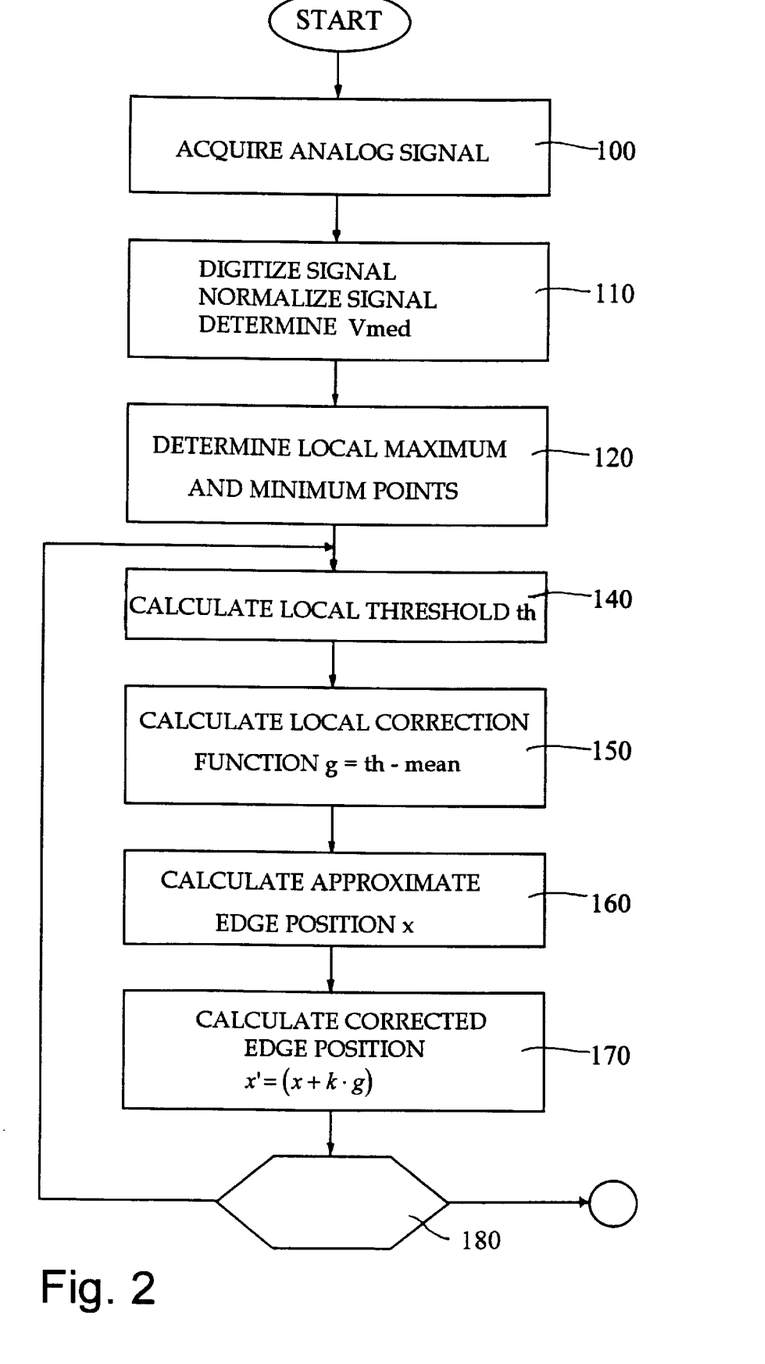
FIG. 2 shows a flow-chart of a sequence of steps of the method according to the present invention.

FIG. 2 shows a block diagram of the operating cycle of electronic processing unit 22.

With reference to FIG. 2, a START block is followed by a block 100, which acquires the analog signal S(t) generated by sensor 20.

Figure 3:
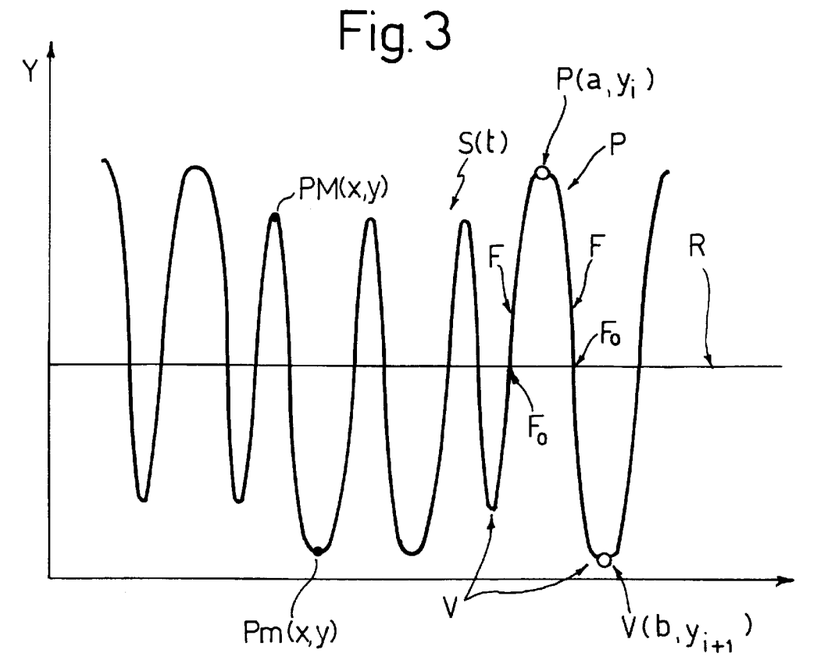
FIG. 3 shows a time graph of an electric signal produced by scanning a bar code.
Figure 6:
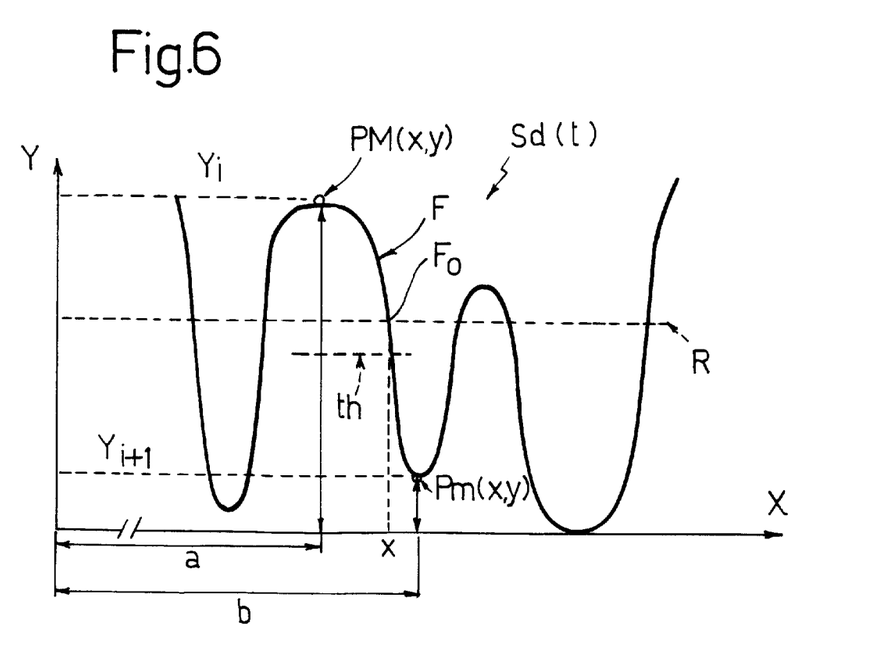
FIG. 6 shows an example of one step of the method according to the present invention.

Analog signal S(t) normally has a substantially bistable waveform (FIGS. 3 and 4) defined by high-amplitude portions P (peaks) alternating with and separated by low-amplitude portions V (valleys). Light in fact is reflected by the bar code spaces, so that a high brightness level impinges on sensor 20 to produce a high value (peak) of signal S(t) and is absorbed by the code bars, so that a low brightness level impinges on sensor 20 to produce a low value (valley) of signal S(t). Each peak P in the signal S(t) waveform therefore represents a space, and each valley V a bar. The region centered at a peak P is defined by two adjacent valleys and represents the width of a space and the region centered at a valley V is defined between two adjacent peaks and represents the width of a bar. FIG. 4 shows an ideal waveform obtained by scanning a bar code in ideal conditions with absolutely no noise and with the code located at the focal point of the optical acquisition system 21 associated with sensor 20. In real conditions, however, in which sensor 20 is subject to a certain amount of blurring B, e.g. when the position of the code does not coincide with the focus of optical acquisition system 21, the above waveform is deformed as shown in FIGS. 3, 5, 6. Blurring has the effect of reducing the amplitude of the peaks representing the narrower spaces of code 8 and of raising the valleys representing the narrower bars of code 8. The edges F of the waveform (FIG. 5), i.e. the steeply sloping waveform portions between peaks P and valleys V and vice versa, are also seriously deformed. As stated, the positions of the edges are seriously affected by blurring when the two adjacent code elements defining the edge are of different sizes (different widths), in which case, the edge shifts towards the wider code element.

Block 100 is followed by a block 110 in which analog signal S(t) is subjected to a known an alog-digital A/D conversion to generate a digitized output signal Sd(t).

Block 110 determines (in known manner) the maximum value Vmax, the minimum value Vmin and the mean value Vmed of digitized signal Sd(t). The maximum, minimum and mean values Vmax, Vmin and Vmed of signal Sd(t) are memorized for subsequent processing. Block 110 may also normalize digitized signal Sd(t) (in known manner) by substituting a conventional unit value ("1") for the maximum value Vmax of signal Sd(t) and a zero value ("0") for the minimum value. The values of signal Sd(t) between the maximum and minimum values are made continuously variable between one and zero.

The above digitization and normalization operations are not essential to the process described later on, in the sense that the method according to the present invention may also operate advantageously with analog and/or not normalized signals. Normalization in fact is mainly introduced to simplify calculation, while digitization is required in the event the present method is performed using digital computers.

Block 110 is followed by a block 120, which determines the local maximum and minimum points of digitized signal Sd(t). Each local maximum point PM(x,y) is located by selecting the point surrounded by a first and second point of a lower amplitude than the selected point (or which has the same amplitude as the previous point and a higher amplitude than the following point); while each local minimum point Pm(x,y) is located by selecting the point surrounded by a first and second point of a higher amplitude than the selected point (or which has the same amplitude as the previous point and a lower amplitude than the following point). The procedures by which to select the local maximum and minimum points of a digitized waveform are widely known and therefore require no further description. Block 120 may also perform discerning operations (not shown) to determine, select and eliminate any spurious maximum and minimum points (i.e. caused by noise). Block 120 therefore generates a sequence of maximum and minimum points, each of which is defined by a pair of x, y coordinates, and relates respectively to the (approximate) position of the center of a high-amplitude portion (peak) of the waveform, and the position of the center of a low-amplitude portion (valley) of the waveform.

The local maximum and minimum points calculated in block 120 are then memorized.

According to the present invention (block 140 following block 120), for each pair of maximum and minimum points (peak or valley or vice versa) adjacent to each other and therefore joined by an edge F of the waveform, a local threshold th is calculated according to the equation:

$$th = (amp1 + amp2)/2 \tag{1}$$

where amp1 (FIGS. 5 and 6) is the amplitude of the maximum or minimum point preceding edge F and amp2 is the amplitude of the maximum or minimum point following edge F. In other words, amp1 and amp2 represent the amplitude assumed by the waveform at the maximum and minimum points defining opposite ends of edge F.

More specifically, the waveform of digitized signal Sd(t) may be represented in a cartesian space (FIG. 6) in which the X axis represents successive scanning times (and therefore different portions of the bar code), the Y axis represents increasing amplitude values of the signal (and therefore increasing brightness values) and the horizontal line R parallel to and a predetermined distance from the X axis (as explained later on) represents a reference axis crossed by edges F. More specifically, the point at which an edge F intersects reference axis R (crossover point Fo) indicates the position of edge F along the waveform and represents the position of the edge between two different-coloured adjacent portions of the bar code (bar and space and vice versa). In the above cartesian representation, amp1 represents the Y axis of the peak or valley preceding edge F and amp2 the Y axis of the valley or peak following edge F.

Block 140 is followed by a block 150, which (for the same pair of maximum and minimum points selected in block 140) calculates a local correction function g according to the equation:

$$g = th - Vmed \tag{2}$$

where this the local threshold calculated in block 140; and Vmed is the mean value of signal Sd(t) calculated in block 110.

Whereas Vmed represents the mean value of the digitized signal, i.e. a global threshold calculated over the whole signal, th (which represents the mean value of a peak-valley pair defining an edge) represents a local threshold in a given portion of the signal.

More specifically, if signal Sd(t) is not blurred (FIG. 4) and the signal is transformed, any edge gives:

amp1=Vmax;

amp2=0;

th=Vmax/2 and since Vmed=Vmax/2 (no blurring in fact is present, and the amplitudes of the peaks and valleys are unchanged with respect to the nominal amplitude)

g=0 (i.e. local correction function g is therefore substantially zero).

Similarly, if the signal is blurred (curve A, FIG. 5) but relative to a sequence of successive code elements (bar-space or vice versa) of the same size:

amp1=Vmax−Δ(blur);

amp2=Δ(blur); and th=Vmax/2;

where Δ(blur) represents the fall in the peak and/or the lift in the valley due to blurring of the signal. Such fall and lift are substantially equal on account of the adjacent code elements being the same size.

If the mean signal value nevertheless still equals Vmax/2, local correction function g is substantially zero.

If the signal is blurred and the adjacent code elements (bar-space or vice versa) are of different sizes:

amp1=Vmax−Δ1 (blur);

amp2=Δ2 (blur); and th≠Vmax/2;

where Δ1 (blur) and Δ2 (blur) respectively represent the fall in the peak and/or the lift in the valley due to blurring of the signal. If the mean signal value nevertheless still equals Vmax/2, local correction function g is other than zero in that th≠Vmax/2.

Block 150 is followed by a block 160, which first determines an approximate position of waveform edge F; which edge position is then refined (block 170 following block 160) by means of a compensation function for eliminating, or at least reducing, the edge position error due to blurring of the signal.

In a preferred embodiment, block 160 calculates, for each edge F, the x coordinate of crossover point Fo along reference axis R, according to the equation:

$$x = a + \frac{\sum_{i=a}^{i=b}(y_{i+1} - y_i)^2}{b - a} \tag{3}$$

where "a" indicates the position (along the X axis) of the i-th maximum (or minimum) point preceding crossover point Fo; $y_i$ is the brightness value (i.e. the signal amplitude measured along the Y axis) of the i-th point; "b" is the position (measured along the X axis) of the i+1-th minimum (or maximum) point following crossover point Fo; and $y_{i+1}$ is the brightness value (i.e. the signal amplitude measured along the Y axis) of the i+1-th point. This technique is computationally straightforward and has proved highly effective in the presence of noisy, low-resolution signals.

Each x coordinate calculated in block 160 according to equation (3) is corrected in block 170 according to the equation:

$$x' = x \cdot (1 + Kg) \tag{4}$$

where x' represents the corrected coordinate value of the crossover point, i.e. the sought compensated position of the edge; x represents the coordinate value calculated in block 160; K is a numeric weight coefficient (in the case of a laser spot with Gaussian intensity distribution, K=2) and g represents the local correction function calculated in block 150 for the same pair of maximum and minimum points used in block 160 to calculate the approximate position of the edge.

Equation (4) therefore shifts the X axis coordinate x to x' to compensate for any blur-induced shift in the edge.

Block 170 is followed by a block 180, which determines whether all the edge positions have been calculated. If they have not, block 180 goes back to block 140 to calculate the local threshold th of a further pair of maximum and minimum points. Conversely, processing is terminated.

The calculated and corrected crossover points Fo are used for further known operations (not shown) downstream from block 180.

Though computationally straightforward (equations 1, 2, 3 and 4 employ straightforward low-computing-power algorithms), the method described provides for effectively determining and compensating for any shift in the waveform edges caused by blurring of the signal.

Alternative methods to the one employed in block 160 may also be used to calculate the edge position.

For example, the edge positions may be determined by calculating the second derivative of digitized signal Sd(t) and determining the points at which the second derivative is zero; each of which points represents the position of an edge, by the edge corresponding, mathematically speaking, to the zero crossing of the second derivative of the analog signal.

Alternatively, the edge positions may be determined by calculating, for each edge between a peak-valley pair, the mean value ym of the signal between the pair, and using this value as reference axis R. This method comprises calculating mean value ym according to the equation:

$$ym = \frac{\sum_{i=a}^{i=b} y_i}{b-a} \quad (5)$$

where $y_i$ is the brightness value of the i-th point of the edge between the two peaks; "a" is the position of the peak-vale preceding the edge and "b" is the position of the valley-peak following the edge.

The point at which digitized signal Sd(t) intersects the reference axis R=ym is then determined and the X axis coordinate x of the point of intersection so determined is taken to be the position of edge F.

In this case too, the compensation function in block 170 may be applied to shift point x to x' using equation (4). In the case of a laser spot with Gaussian intensity distribution, the ideal compensation coefficient is K=2.

The edge position may also be calculated by determining the point at which digitized signal Sd(t) intersects the reference axis R=th (where th is the local threshold calculated in block 140); and the X axis coordinate x of the point of intersection so determined is taken to be the edge position.

What is claimed is:

1. A method of compensating the edge positions of a signal generated by scanning a bar code, wherein said signal (S(t), Sd(t)) has a substantially alternating waveform defined by a sequence of high-amplitude peaks separated by low-amplitude valleys; each peak corresponding to a space of the code (8) and each valley corresponding to a bar of the code (8); the peaks being joined to the valleys by steeply sloping waveform edges (F); characterized by comprising the steps of:

calculating (160) a number of parameters (x), each representing a determined position (160) of a respective edge (F) along said waveform;

determining (110) a global threshold (Vmed) calculated over substantially the whole of said signal;

calculating (140) a local threshold (th) in a predetermined region of said signal;

calculating (150) a local correction function (g) by means of said global threshold (Vmed) and said local threshold (th); and applying (170) said local correction function (g) to a said calculated parameter (x) to generate an output corrected parameter (x') relative to a compensated position of said edge (F), said compensated position recovering possible shifts in the edge.

2. A method as claimed in claim 1, characterized in that said local threshold (th) is calculated on the basis of signal values (amp1, amp2) determined at an adjacent peak-valley pair defining an edge (F) to be compensated.

3. A method as claimed in claim 1, characterized in that said step of calculating (140) a local threshold (th) comprises the step of calculating said local threshold (th) by means of a linear combination of a first and a second addend (amp1, amp2); said first and said second addend (amp1, amp2) being correlated to the amplitude assumed by said signal respectively at a maximum point and a minimum point defining opposite ends of the edge (F) for compensation.

4. A method as claimed in claim 3, characterized in that said local threshold (th) is defined by the equation:

$$th=(amp1+amp2)/2$$

where: th represents said local threshold and amp1 and amp2 respectively represent said first and said second addend.

5. A method as claimed in claim 1, characterized in that said step of determining a global threshold (Vmed) comprises the step of calculating the mean value of said signal.

6. A method as claimed in claim 1, characterized in that said step of calculating a local correction function (150) comprises the step of calculating the local correction function according to the equation:

$$g=th-Vmed$$

where g represents the local correction function, th represents said local threshold and Vmed represents said global threshold.

7. A method as claimed in claim 1, characterized in that said step of applying (170) said local correction function to a calculated said parameter (x) comprises the step of effecting the transformation:

$$x'=x \cdot (1+Kg)$$

where x' represents the value of a parameter relative to a compensated position of said edge, x represents the value of a calculated parameter, K is a numeric weight coefficient and g is said local correction function.

8. A method as claimed in claim 7, characterized in that said numeric weight coefficient is close to the numeric value two (K=2).

9. A method as claimed in claim 1, wherein said waveform is representable in a Cartesian reference system in which the abscissa represents different portions of the bar code, and the ordinate represents increasing amplitude values of the signal; characterized in that said parameters (x) are calculated according to the equation:

$$x = a + \frac{\sum_{i=a}^{i=b} (y_{i+1} - y_i)^2}{b-a}$$

where "a" is the position, along the abscissa, of the i-th maximum or minimum point preceding an edge; $y_i$ is the signal amplitude value measured along the ordinate at the i-th point; "b" is the position, along the abscissa, of the i+1-th minimum or maximum point following the edge and $y_{i+1}$ is the signal amplitude value at the i+1-th point.

10. A method as claimed in claim 1, characterized in that the step of calculating (160) said parameters (x) comprises the step of calculating the second derivative of said signal (Sd(t)), and determining the coordinates of the points at which the second derivative is cancelled.

11. A method as claimed in claim 1, characterized in that the step of calculating (160) said parameters (x) comprises the steps of:

calculating, for each edge between a peak-valley pair, the mean value (ym) of the signal between said pair;

assuming said mean value (ym) as a reference axis (R);

determining the point at which the waveform (Sd(t)) intersects said reference axis (R); and assuming a coordinate (x) of the point of intersection as a parameter (x).

12. A method as claimed in claim 1, characterized in that the step of calculating (160) said parameters (x) comprises the steps of:

assuming said local threshold (th) as a reference axis (R);

determining the point at which the waveform (Sd(t)) intersects said reference axis (R); and assuming a coordinate (x) of the point of intersection as a parameter (x).

* * * * *

UNITED STATES PATENT AND TRADEMARK OFFICE
CERTIFICATE OF CORRECTION

PATENT NO. : 6,102,292
DATED : August 15, 2000
INVENTOR(S) : Rinaldo Zocca et al.

It is certified that error appears in the above-identified patent and that said Letters Patent is hereby corrected as shown below:

Title page,
Please insert the Foreign Application Priority Data:
-- December 5, 1997    [EP]    European Patent Application  97830652.0 --

Signed and Sealed this

Twenty-third Day of October, 2001

Attest:

*Attesting Officer*

NICHOLAS P. GODICI
*Acting Director of the United States Patent and Trademark Office*